(No Model.)

F. J. REINHOLD & A. W. SLAYTON.
ODOMETER.

No. 450,380. Patented Apr. 14, 1891.

Witnesses
John Schuman.
John F. Miller

Inventors
Augustus W. Slayton
Frank J. Reinhold
By their Attorney
Newell S. Wright.

UNITED STATES PATENT OFFICE.

FRANK. J. REINHOLD AND AUGUSTUS W. SLAYTON, OF DETROIT, MICHIGAN; SAID REINHOLD ASSIGNOR TO SAID SLAYTON.

ODOMETER.

SPECIFICATION forming part of Letters Patent No. 450,380, dated April 14, 1891.

Application filed December 22, 1890. Serial No. 375,657. (No model.)

*To all whom it may concern:*

Be it known that we, FRANK. J. REINHOLD, AUGUSTUS W. SLAYTON, citizens of the United States, residing at Detroit, county of Wayne, State of Michigan, have invented a certain new and useful Improvement in Odometers; and we declare the following to be a full, clear, and exact description of the same, such as will enable others skilled in the art to which it appertains to make and use the same, reference being had to the accompanying drawings, which form a part of this specification.

Our invention relates to certain new and useful improvements in odometers; and it consists of the devices and appliances, their construction, combination, and arrangement, as hereinafter described and claimed, and pointed out in the accompanying drawings, in which—

Figure 1:
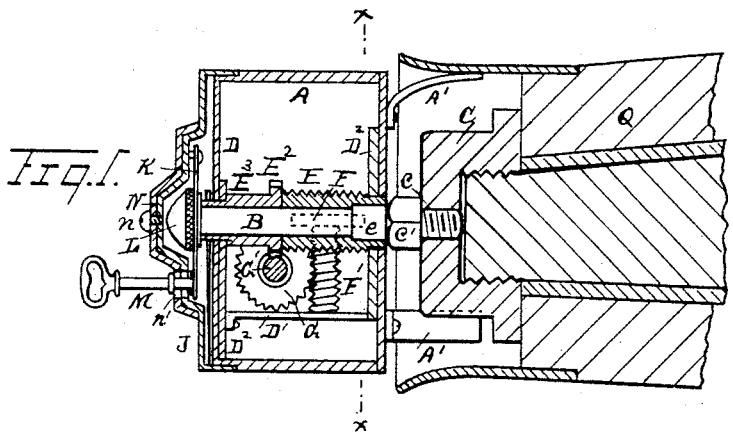
Figure 2:
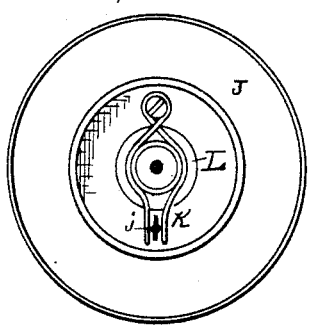
Figure 3:
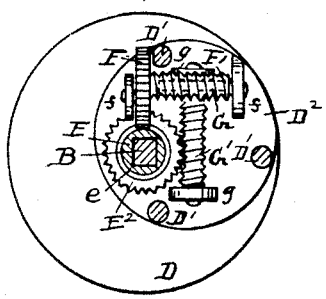
Figure 4:
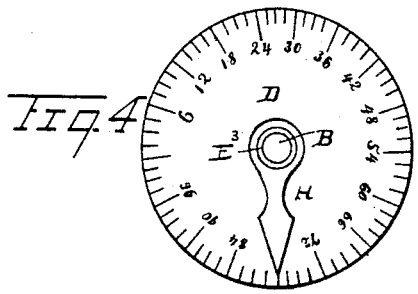

Figure 1 is a vertical section illustrating my invention. Fig. 2 is a view in elevation, looking toward the inside of the cover. Fig. 3 is a sectional view on the line $x\ x$, Fig. 1; and Fig. 4 is a view of the dial.

Our invention contemplates an improved device of this class of simple and economical construction and of increased efficiency and utility, which shall also be more ready and secure and reliable in its application.

To these ends we carry out our invention as follows:

A represents a cylindrical case provided with any suitable means of attachment to the hub Q of a vehicle in order to cause the rotation of the case with the wheel. As shown in the drawings, the said case is provided with wings A', arranged to bind against the inner periphery of the hub at the outer end, and thereby cause the free rotation of the case as the hub revolves.

B denotes a stem, having a screw-threaded engagement in the nut C, usually located upon the outer extremity of the axle of the vehicle to hold the wheel thereupon. To this end said nut may be provided with a threaded orifice, as at $c$, to receive the end of said stem. The stem is provided with a jam-nut $c'$.

D denotes a supporting-disk having a fixed engagement with the rotatable case A and rotatable therewith, said disk being provided with suitable arms D' connecting heads $D^2$ with the disk. The stem B is passed through said heads and said disk and secured in place in any suitable manner therein. A worm-gear E is sleeved upon said stem and made stationary therewith in any desired manner, as by securing the end of the orifice in said gear and the adjacent portion of said stem, as shown at $e$.

Meshing with the worm E is a pinion F, provided with a worm-extension F', suitably journaled in brackets $f$ upon the disk D.

G is a gear meshing with the worm-extension F', and itself provided, also, with a worm-extension G', suitably journaled in brackets $g$ upon the disk D.

Meshing with the worm-extension G' is a gear $E^2$, sleeved upon the end of the stem B and provided with a sleeve-extension $E^3$, projecting through the disk D and carrying an index-finger H. The outer face of the disk D is provided with a suitable index, as shown. It will be seen that the index-finger and the dial plate or disk D both revolve with differential speed.

It will be obviously of great advantage to securely lock the device in such a manner that it cannot be tampered with. This we contemplate doing in any suitable manner to prevent access to the index-finger and dial without a key to afford access thereto. As shown in the drawings, we accomplish this end as follows: A cover J is provided to fit over the dial and the index-finger, the same being held upon the end of the stem B by means of a spring K. For this purpose the end of said stem is provided with a thumb-nut L to hold the spring upon the stem when the cover is locked upon the odometer. The spring in this instance consists of a two-leaved spring located astride the stem in the rear of the nut L. The arrangement is such that a suitable key M, inserted between the leaves of the spring, may so open said leaves as to allow the spring to slip over the nut adjacent thereto. Accordingly the cover J is provided with a key-hole, as at $j$.

To cover the key-hole we locate upon the cover a cover-disk W, preferably having a pivotal connection therewith, as shown at $n$, said cover-disk being also provided with a key-hole, as at $n'$. By turning the cover-disk until the two key-holes come into coincidence the key may be inserted to spread the spring and allow the cover J to be removed. The thumb-nut being made conical, as shown, allows the spring to slip back in place when the cover is to be re-engaged upon the odometer.

What we claim as our invention is—

1. In an odometer, a case provided with means for attaching it to the hub of a vehicle, a dial carried by said case, a gear secured within said case against rotation, gears secured within said case and rotating therewith and meshing with the non-rotating gear, whereby they receive a motion independent of their revolution with the case, and an index-finger operated by said gear.

2. In an odometer, the combination, with a case adapted to be secured to rotate with the hub of a vehicle, of a non-rotating stem projecting with its ends through said case, one end being adapted to engage the nut of the vehicle-axle, a worm E, sleeved upon said stem and keyed therewith, a worm F', journaled to said case to turn therewith and provided with a gear F to engage the worm E, a worm G', journaled in said case to turn therewith and provided with a gear G to engage the worm F', a sleeve $E^3$, to turn on said non-rotating stem and provided with a gear to mesh with the worm G', an index-finger carried by the outer end of said sleeve $E^3$, and an index-face secured to the case adjacent to the index-finger.

3. In an odometer, the combination, with the casing, the inclosed operating mechanism, the index, and index-finger located on the outside thereof, of a head located on the outside of the casing, a cap having a spring-clasp to engage said head, and thereby hold the cap over the index-finger to protect the same, and a key for releasing the clasp from the head.

4. In an odometer, the combination, with the casing, the inclosed operating mechanism, the index, and index-finger located on the outside thereof, of a head projecting from the casing, a cap having a spring-clasp to engage said head, and thereby hold the cap over the index-finger, a plate pivoted to said cap, said plate and cap having a registering key-hole, and a key for releasing the cap from the head.

5. In an odometer, a case provided with means of attachment to a wheel, a stem attachable to the axle of the wheel, an index-finger, a worm located upon said stem and gear-connected with said finger meshing with said worm to rotate the finger, substantially as set forth.

In testimony whereof I sign this specification in the presence of two witnesses.

FRANK. J. REINHOLD.

Witnesses:
JOSEPH M. LOW,
N. S. WRIGHT.

In testimony whereof I sign this specification in the presence of two witnesses.

AUGUSTUS W. SLAYTON.

Witnesses:
WALTER C. BURRIDGE,
C. E. COLLINS.